US007463910B2

United States Patent
Wang et al.

(10) Patent No.: US 7,463,910 B2
(45) Date of Patent: Dec. 9, 2008

(54) APPARATUS AND METHOD FOR DETERMINING SLEEP CLOCK TIMING

(75) Inventors: Michael Mao Wang, San Diego, CA (US); Fuyun Ling, San Diego, CA (US); Rajiv Vijayan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 11/271,409

(22) Filed: Nov. 9, 2005

(65) Prior Publication Data

US 2006/0205382 A1   Sep. 14, 2006

Related U.S. Application Data

(60) Provisional application No. 60/660,833, filed on Mar. 10, 2005.

(51) Int. Cl.
  H04M 1/00   (2006.01)
  H04B 1/16   (2006.01)
(52) U.S. Cl. .................. 455/574; 455/127.5; 455/343.1
(58) Field of Classification Search .................. 455/574, 455/572, 550.1, 127.5, 127.1, 573, 343.1, 455/343.5; 370/311, 318
See application file for complete search history.

(56) References Cited

U.S. PATENT DOCUMENTS

| | | | | |
|---|---|---|---|---|
| 5,613,235 A | * | 3/1997 | Kivari et al. ................. | 455/574 |
| 5,828,248 A | | 10/1998 | Masuda | |
| 5,874,846 A | | 2/1999 | Lee | |
| 5,950,120 A | | 9/1999 | Gardner et al. | |
| 6,016,312 A | * | 1/2000 | Storm et al. ................. | 370/311 |
| 6,029,061 A | * | 2/2000 | Kohlschmidt ............... | 455/574 |
| 6,176,611 B1 | * | 1/2001 | Schushan et al. ........... | 368/202 |
| 6,212,398 B1 | * | 4/2001 | Roberts et al. ............. | 455/502 |

(Continued)

FOREIGN PATENT DOCUMENTS

EP     0 586 256 A2    3/1994

(Continued)

OTHER PUBLICATIONS

International Search Report PCT/US06/008456, International Search Authority European Patent Office, Jun. 20, 2006.

*Primary Examiner*—Sonny Trinh
(74) *Attorney, Agent, or Firm*—Stanton Braden; Kenneth K. Vu; Thomas R. Rouse

(57) ABSTRACT

Apparatus and methods for estimating the frequency of a sleep or slow clock by selectively utilizing an estimated sleep clock frequency and an estimated change in the sleep clock frequency. The disclosed apparatus includes a sleep clock frequency estimator to output a fast clock derived sleep clock frequency estimate and a sleep clock change frequency estimator to output an estimate of a change in frequency of the sleep clock. The apparatus further includes a combiner that weights at least one of the fast clock derived sleep clock frequency estimate to obtain a weighted sleep clock frequency estimate and the estimate of the change in frequency of the sleep clock to obtain a weighted estimate of the change in frequency of the sleep clock. The combiner also determines a new estimate of the sleep clock frequency using at least one of the weighted sleep clock frequency estimate and the weighted estimate of the change in frequency of the sleep clock. Complementary methods are also disclosed.

34 Claims, 7 Drawing Sheets

U.S. PATENT DOCUMENTS

| | | |
|---|---|---|
| 6,411,830 B2 * | 6/2002 | Alon et al. .................. 455/574 |
| 6,453,181 B1 * | 9/2002 | Challa et al. ................ 455/574 |
| 6,728,234 B1 | 4/2004 | Hoffmann et al. |
| 6,961,287 B2 | 11/2005 | Jung |
| 7,113,810 B2 * | 9/2006 | Kim .......................... 455/574 |
| 7,197,341 B2 | 3/2007 | Bultan et al. |
| 2007/0105525 A1 * | 5/2007 | Wang et al. ............. 455/343.1 |

FOREIGN PATENT DOCUMENTS

| | | |
|---|---|---|
| EP | 0851593 | 7/1998 |
| EP | 0 924 947 A1 | 6/1999 |
| EP | 0939495 | 9/1999 |
| GB | 2 350 754 A | 12/2000 |
| WO | 00010354 | 2/2000 |
| WO | WO 02/47281 A1 | 6/2002 |

* cited by examiner

US 7,463,910 B2

APPARATUS AND METHOD FOR DETERMINING SLEEP CLOCK TIMING

CLAIM OF PRIORITY UNDER 35 U.S.C. §119

The present Application for Patent claims priority to Provisional Application Ser. No. 60/660,833 entitled "PADME Sleep Time Tracking" filed Mar. 10, 2005, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"APPARATUS AND METHODS FOR ESTIMATING A SLEEP CLOCK FREQUENCY" by Michael Wang et al., application Ser. No. 11/271445, filed concurrently herewith, assigned to the assignee hereof, and expressly incorporated by reference herein.

BACKGROUND

1. Field

The present disclosure relates to methods and apparatus for estimating a sleep clock frequency and, more particularly, estimating a sleep clock frequency using a combiner to selectively determine an estimate of the sleep clock frequency.

2. Background

Mobile wireless devices, such as mobile phones, typically employ clock that provides very accurate timing for various functions within the device including keeping the system time. These clocks many times are embodied using temperature controlled crystal oscillators (TCXOs). TCXOs, however, use a relatively large amount of power, drawing approximately 1.5 mA of current.

In order to improve the battery life of a mobile device, it is known to place most current consuming units within the device into a power saving mode and maintain the system time using low-power sleep circuits. Because of the high current draw of TCXOs, it is not energy efficient to use such devices to maintain system time for sleep circuits. Accordingly, it is known to maintain system timing during sleep or power saving modes using by using a sleep controller having a much lower power usage (e.g., a clock with a current draw of 200 µA) and a lower frequency (e.g., 30-60 kHz) than TCXO devices, which operate a higher frequency (e.g., 44-66 MHz). This is typically accomplished with a cost effective crystal oscillator clock at the expense of some accuracy in time keeping because the clock frequency tends to fluctuate. This clock is otherwise known as the "sleep clock" or "slow clock." Thus, when the mobile device is asleep, the TCXO (or "fast clock") is off. The sleep clock is used as a timer to wake up the system. Upon wake up, once the fast clock becomes stable after waking up, system timing is once again handed over to the fast clock.

It is noted that when a mobile device wakes up from a sleep mode, it is important to have an accurate system time as kept by the sleep clock. Since the sleep clock is used for system timing during sleep modes, the accuracy of the clock timing will directly affect the system time when the mobile transceiver wakes up prior to re-acquisition of timing based on information received from the wireless network, such as a CDMA based network. A good estimate of slow clock frequency is therefore desirable. Known timing estimation utilized by mobile devices, however, is typically used only for initial calibration and the slow clock time tracking is solely dependent on Pseudo Noise (PN) code timing. In certain wireless systems not employing PN timing (e.g., Orthogonal Frequency Division Multiplexing (OFDM)), however, this timing in not available. Thus, in such systems the accuracy of the sleep clock timing is even more important. In the case of OFDM, in particular, such systems are more susceptible to timing errors such as synchronization timing made worse by intersymbol interference.

It is further noted that issues exist related to determining an accurate estimate of the slow clock. First, the resolution of sleep clocks is low and the sleep clock is not synchronized with the fast clock. This issue can be resolved, however, by using the fast clock (derived from TCXO) to count the fractional part of the sleep clock as detailed, for example, in the co-pending U.S. Patent Application entitled "APPARATUS AND METHODS FOR ESTIMATING A SLEEP CLOCK FREQUENCY" referenced above and expressly incorporated by reference.

Furthermore, because the slow clock is a low accuracy, free running crystal without temperature compensation, the system time may drift during sleep. Accordingly, it is desirable to account for this drift and thus determine a maximum sleep time that may be set for the mobile device so that there is no need for re-acquisition of system time on wakeup. Finally, because the sleep clock is used as a timer during sleep, it is necessary to have a good estimate of the sleep clock frequency before going to sleep.

It is possible using the methodologies above to achieve an accurate estimate of the sleep clock frequency for specific situations. However, in the case of OFDM, for example, determining system timing using CDMA PN codes may not be available for determining timing. Moreover, determining an estimate of the sleep clock using the fast clock may yield a very accurate estimate of the sleep clock frequency, but does not account for the change or error due to drift of the sleep clock. Furthermore, if the sleep clock frequency is accurately determined and the error or drift of the sleep frequency is determined, how to combine this information to yield an accurate result has not been contemplated in the known art.

SUMMARY

Apparatus and methods are presently disclosed determining accurate sleep clock timing. In one example, an apparatus is disclosed for determining a frequency estimate of a sleep clock. In particular, the apparatus includes a sleep clock frequency estimator configured to output a fast clock derived sleep clock frequency estimate; a sleep clock change frequency estimator configured to output an estimate of a change in frequency of the sleep clock; and a combiner configured to weight at least one of the fast clock derived sleep clock frequency estimate to obtain a weighted sleep clock frequency estimate and the estimate of the change in frequency of the sleep clock to obtain a weighted estimate of the change in frequency of the sleep clock, and to determine at least one new estimate of the sleep clock frequency using at least one of the weighted sleep clock frequency estimate and the weighted estimate of the change in frequency of the sleep clock.

According to another disclosed example, a processing circuit for estimating a sleep clock frequency for use in a wireless transceiver system includes a sleep clock frequency estimator configured to output a fast clock derived sleep clock frequency estimate; a sleep clock change frequency estimator configured to output an estimate of a change in frequency of the sleep clock; a combiner configured to selectively weight at least one of the fast clock derived sleep clock frequency estimate to obtain a weighted sleep clock frequency estimate and the estimate of the change in frequency of the sleep clock to obtain a weighted estimate of the change in frequency of the sleep clock, and to determine at least one new estimate of the sleep clock frequency using at least one of the weighted sleep clock frequency estimate and the weighted estimate of the change in frequency of the sleep clock; a memory device configured to store the at least one new estimate of the slow clock frequency weighting estimate; and a processor configured to read the at least one new estimate from the memory device and calculate a system sleep time based on the at least one new estimate prior to entering the system into a sleep mode.

In still another example, a wireless device is disclosed for use in a mobile communications network. The device includes a sleep clock frequency estimator configured to output a fast clock derived sleep clock frequency estimate; a sleep clock change frequency estimator configured to output an estimate of a change in frequency of the sleep clock; a combiner configured to selectively weight at least one of the fast clock derived sleep clock frequency estimate to obtain a weighted sleep clock frequency estimate and the estimate of the change in frequency of the sleep clock to obtain a weighted estimate of the change in frequency of the sleep clock, and to determine at least one new estimate of the sleep clock frequency using at least one of the weighted sleep clock frequency estimate and the weighted estimate of the change in frequency of the sleep clock; a memory device configured to store the at least one new estimate of the slow clock frequency weighting estimate; and a processor configured to read the at least one new estimate from the memory device and calculate a sleep time of the wireless device based on the at least one new estimate prior to entering the system into a sleep mode.

In yet another example, a method for estimating the frequency of a sleep clock is disclosed. The method includes estimating a change in sleep clock frequency; determining a weighted estimated change in sleep clock frequency using a calculated coefficient to weight the value of the sleep clock frequency change; determining a new estimate for sleep clock frequency using the weighted estimated change in sleep clock frequency and a previous estimated sleep clock frequency and storing the new estimate in a memory device; estimating a sleep clock frequency using a fast clock; determining a weighted estimated sleep clock frequency using at least another calculated coefficient to weight the value of the estimated sleep clock frequency; determining a further new estimate for sleep clock frequency using weighted estimated change in sleep clock frequency and the previously stored new estimate for sleep clock frequency; and storing the further new estimate in memory such that the further new estimate replaces the new estimate.

According to still another example, a computer readable medium is disclosed having instructions stored thereon, the stored instructions, when executed by a processor, causing the processor to perform a method of estimating the frequency of a sleep clock. The method performed includes estimating a change in sleep clock frequency; determining a weighted estimated change in sleep clock frequency using a calculated coefficient to weight the value of the sleep clock frequency change; determining a new estimate for sleep clock frequency using the weighted estimated change in sleep clock frequency and a previous estimated sleep clock frequency and storing the new estimate in a memory device; estimating a sleep clock frequency using a fast clock; determining a weighted estimated sleep clock frequency using at least another calculated coefficient to weight the value of the estimated sleep clock frequency; determining a further new estimate for sleep clock frequency using weighted estimated change in sleep clock frequency and the previously stored new estimate for sleep clock frequency; and storing the further new estimate in memory such that the further new estimate replaces the new estimate.

In yet another example, an apparatus is disclosed for estimating the frequency of a sleep clock. The apparatus includes means for estimating a change in the sleep clock frequency; means for determining a weighted estimated change in sleep clock frequency using a calculated coefficient to weight the value of the sleep clock frequency change; means for determining a new estimate for sleep clock frequency using the weighted estimated change in sleep clock frequency and a previous estimated sleep clock frequency; means for storing that stores the new estimate; means for estimating a sleep clock frequency using a fast clock; means for determining a weighted estimated sleep clock frequency using at least one calculated coefficient to weight the value of the estimated sleep clock frequency; and means for determining a further new estimate for sleep clock frequency using weighted estimated change in sleep clock frequency and the previously stored new estimate for sleep clock frequency. It is further noted that in this example the means for storing stores the further new estimate such that the further new estimate replaces the new estimate.

DETAILED DESCRIPTION

Figure 1:
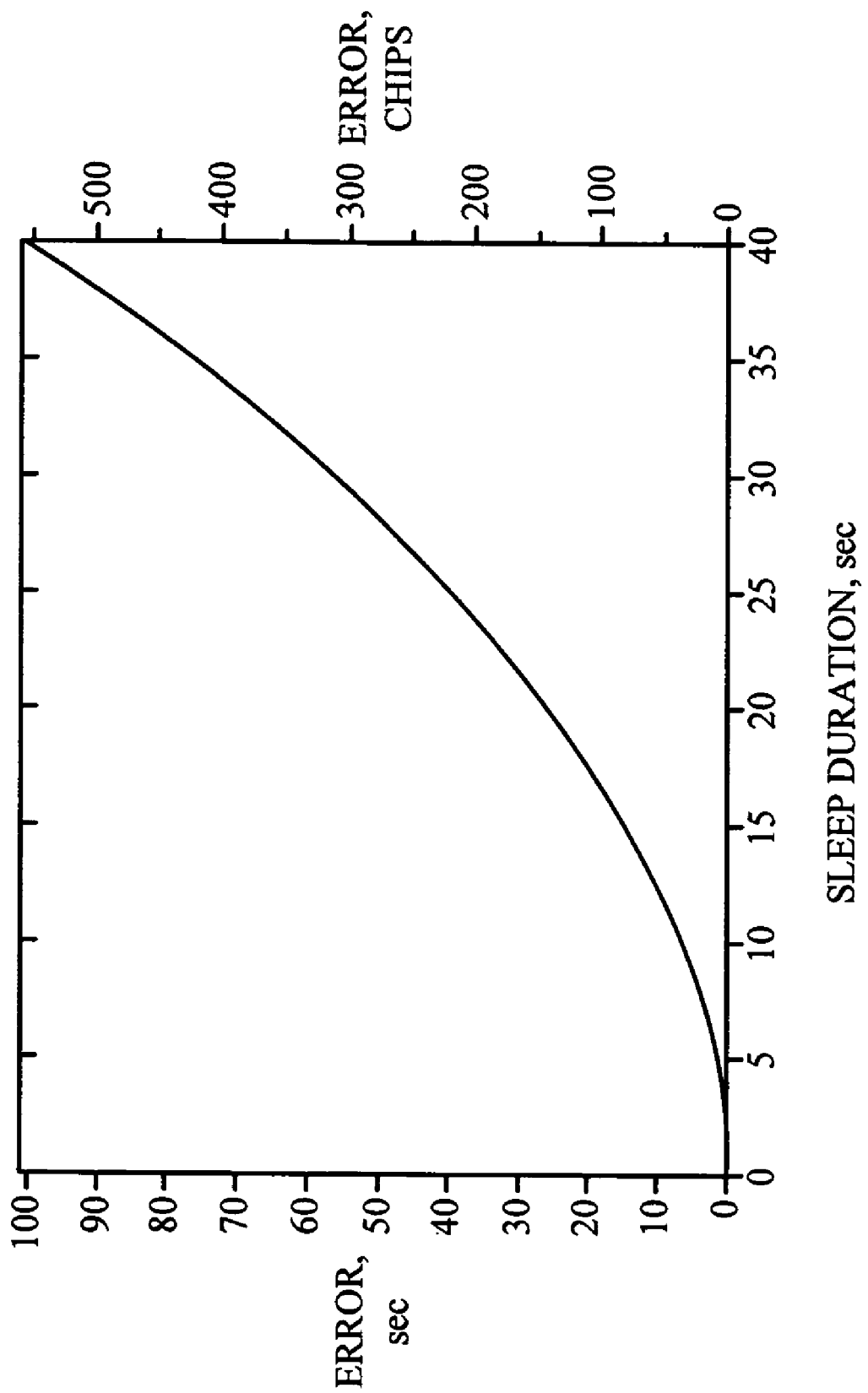
FIG. 1 is a plot of the error in sleep timing as a function of the sleep time duration.

In order to determine an accurate estimate of slow clock frequency, apparatus and methods are presently disclosed that combine a slow clock frequency estimate with an estimate of the slow clock frequency change. The combination of these estimates if performed selectively where the estimates are multiplied by coefficients based on the reliability of the estimate source. By taking into account both estimates, as well as weighting those estimates based on reliability, the In order to ensure an accurate estimate of the sleep clock frequency, the accuracy is first modeled. The slow/sleep clock frequency accuracy as a function of temperature can be modeled as:

$$\Delta f/f = -0.035(25-T)^2 \text{ ppm} \quad (1)$$

where T is the temperature in degrees Celsius and the base frequency of a sleep clock crystal at 25° C. is 32kHz in this example. The type of crystal will, of course, affect the values of the coefficients in equation (1) and, thus, this is only exemplary. The frequency rate of change rate with respect to temperature is thus given as:

$$\left. \frac{\partial f}{\partial T} \right/ f = 1.75 - 0.07T \text{ ppm}/^\circ \text{C}. \quad (2)$$

Assuming that the temperature change over time for the sleep clock is defined by $$\left| \frac{\partial T}{\partial t} \right| < 0.04^\circ \text{ C./sec} \quad (3)$$

the frequency change over time is then given as:

$$\left| \frac{\partial f}{\partial t} \middle/ f \right| = \left| \frac{\partial f}{\partial T} \middle/ f \right| \left| \frac{\partial T}{\partial t} \right| < 0.07 - 0.0028T \text{ ppm/sec.} \quad (4)$$

Assuming the operating temperature range is $-20^\circ$ C. to $70^\circ$ C., the maximum frequency change rate would be $$\left| \frac{\partial f(t)}{\partial t} \middle/ f(t) \right| < 0.126 \text{ ppm/sec.} \quad (5)$$

If the a mobile transceiver decides to go to sleep from a time t to t+$\Delta$t, the timing error $\epsilon$ due to the time varying characteristics of the sleep clock is then determined by the following:

$$\varepsilon = \int_t^{t+\Delta t} \frac{f(\tau)}{f(t)} d\tau - \Delta t \quad (6)$$

$$= \int_t^{t+\Delta t} \left( 1 + \sum_{n=1}^{\infty} \left( \frac{\partial^n f(t)}{\partial t^n} \middle/ f(t) \right) \frac{(\tau - t)^n}{n!} \right) d\tau - \Delta t$$

$$= \int_t^{t+\Delta t} \left( \sum_{n=1}^{\infty} \left( \frac{\partial^n f(t)}{\partial t^n} \middle/ f(t) \right) \frac{(\tau - t)^n}{n!} \right) d\tau$$

If the high order terms (i.e., $$\frac{\partial^n f(t)}{\partial t^n} = 0,$$

for $n \geq 2$) are ignored for sake of simplification, the timing error can then be expressed as:

$$\varepsilon = \frac{\Delta t^2}{2} \left( \frac{\partial f(t)}{\partial t} \middle/ f(t) \right). \quad (7)$$

Substituting equation (5) into (7) yields a value of the error $\epsilon$ expressed as:

$\epsilon < 0.063 \Delta t^2$ ppm•sec=$0.063 \Delta t^2$ μsec. (8)

Expressed another way, the timing error $\epsilon$ of the slow clock may be expressed as:

$\epsilon < 0.35 \Delta t^2$ chips (9)

in the unit of chips. Equations (8) and (9) are both plotted in FIG. 1 to show timing error both in units of μsec as well as chips. As may be seen in FIG. 1, the error rises as the duration of a sleep mode increases, with an increasing rate of change. It is noted that since the higher order terms are ignored, Equations (8) and (9) no longer serve as an upper bound.

It is noted that the above example is used for the purpose of explaining concepts underlying the presently disclosed apparatus and methods. The parameters and coefficients used are thus based on typical slow clock crystal parameters, but are not meant to limit the disclosure to such parameters, coefficients or types of slow clock crystals.

Because a synchronizer tracking circuit within a mobile transceiver can tolerate timing errors up to ±128 chips, if the sleep clock calibration error is ignored before the mobile goes to sleep, the short sleep time between received frames (less than ¼ second) is not a problem as long as the channel is well behaved during that period. It is safe for the mobile to go to sleep for any time less than 10 seconds (the flat zone), taking into consideration channel variation and sleep clock tracking error (discussed in the next section). For sleep times of more than 15 sec, re-acquisition of a TDM Pilot II or even TDM Pilot I, in the case of CDMA, is necessary since the sleep clock variance rises quickly in that region. For sleep times from 20-35 sec, re-acquisition of TDM Pilot II is necessary since TDM Pilot II allows ±512 chips of timing errors. For sleep times of more than 35 sec, acquiring TDM Pilot I is necessary. Unlike the initial acquisition of TDM Pilot I at power up, we have a rough position of TDM Pilot I. Re-acquiring TDM Pilot I is, therefore, not as costly as is in the initial acquisition.

Figure 2:
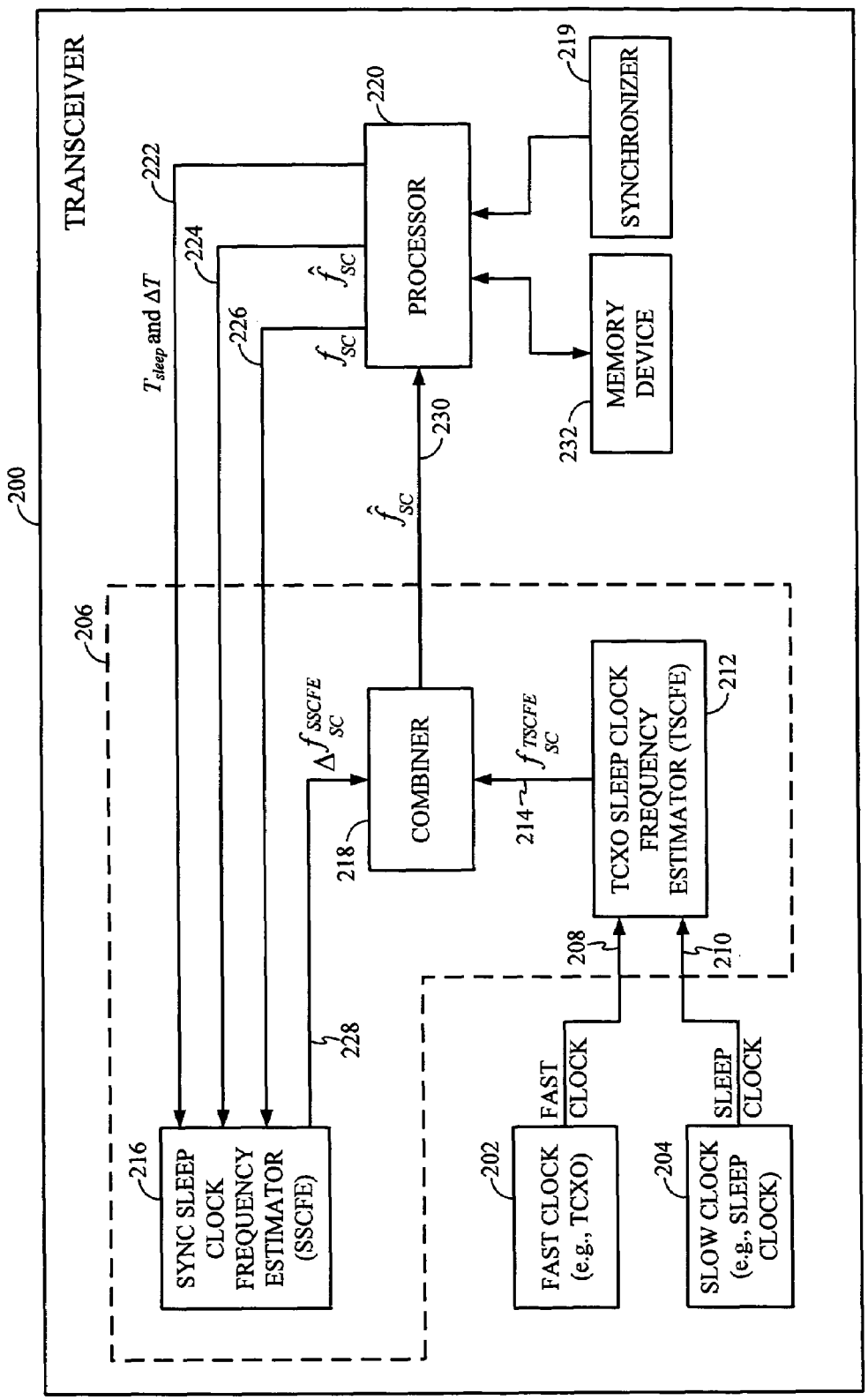
FIG. 2 is a block diagram of an exemplary device, such as a mobile transceiver, employing a sleep clock frequency estimator according to the present disclosure.

FIG. 2 illustrates a block diagram of an exemplary device, such as a mobile transceiver, employing sleep clock frequency estimator according to the present disclosure. Since errors in estimating the sleep clock frequency prior to a transceiver device being put to sleep can affect the length of time the device can sleep before the next wakeup time, a higher degree of accuracy of the estimate is beneficial. The exemplary device illustrated in FIG. 2 serves to reduce the estimation error. As shown, a transceiver 200 includes both a fast clock 202 and a slow or sleep clock 204. A sleep clock frequency estimator 206 receives a fast clock signal 208 and a sleep clock signal 210 from clocks 202 and 204, respectively. Specifically, the fast and sleep clock signals 208, 210 are sent to a fast clock based sleep clock frequency estimator (TSCFE) 212, which determines an estimate of the sleep clock frequency ($f_{SC}^{TSCFE}$) based on the fast clock implemented with a oscillator such as a TCXO. As an example, the sleep cock frequency estimator 212 may be configured as described in co-pending U.S. Patent Application entitled "APPARATUS AND METHODS FOR ESTIMATING A SLEEP CLOCK FREQUENCY" referenced above and expressly incorporated by reference. The TCXO sleep clock frequency estimator 212 outputs the fast clock derived estimate of the sleep clock frequency ($f_{SC}^{TSCFE}$) 214 to a combiner 218, which will be discussed further below in connection with FIG. 4.

FIG. 2 illustrates that the sleep clock frequency estimator 206 also includes a synchronizer sleep clock frequency estimator (SSCFE) 216. The synchronizer sleep clock frequency estimator 216 uses the first arriving path (FAP) as a reference, in the case of CDMA, or the start of a FFT/demodulation window as a reference in the case of OFDM, for example. An estimation of the FAP determined by a synchronizer 219, which may be separate as shown or a part of a processor 220. The synchronizer 219 provides the estimation of the FAP to the SSCFE 216 either directly, or via the processor 220 as illustrated in FIG. 2.

It is noted here that an error in sleep clock frequency as a result of frequency estimation error before the device 200 is put to sleep and frequency drift of the sleep clock 204 during sleep results in an FAP drift on wakeup. This drift can be utilized, however, to correct the sleep clock frequency error. In particular, the SSCFE 216 utilizes this information to determine an estimate of the frequency change ($\Delta f_{SC}^{SSCFE}$), which is the difference between the measured slow clock frequency ($f_{SC}$) after wakeup and the previous estimate of the slow clock frequency ($\hat{f}_{SC}$) determined by the slow clock frequency estimator 206 before going to sleep (i.e., $\Delta f_{SC}^{SSCFE} = f_{SC} - \hat{f}_{SC}$).

Specifically concerning using the FAP drift to determine $\Delta f_{SC}^{SSCFE}$, a measured difference $\Delta T$ between the actual FAP upon wakeup and the expected FAP based on $\hat{f}_{SC}$ may be determined. Using the $\Delta T$ and the sleep time $T_{sleep}$ of the transceiver 200, the estimate $\Delta f_{SC}^{SSCFE}$ may be formulated as follows:

$$\Delta f_{SC}^{SSCFE} = f_{SC} - \hat{f}_{SC} = \frac{\Delta T}{T_{sleep}} f_{SC}. \quad (10)$$

It is noted that the value of $\Delta T$ will be negative if the expected FAP lags behind the actual FAP upon wakeup.

Notwithstanding the above formulation, use of the FAP drift to correct the sleep clock frequency error is subject to four potential error sources. The first two sources of error are the movement or jitter of the FAP, which introduces error, and the estimation of the FAP position. Both result in false corrections to the sleep clock frequency estimate. It is further noted, however, that the second error source is negligible for a CDMA transceiver since the CDMA searcher/delay lock loop (DLL) can provide timing accuracy as high as a fractional PN chip. Nonetheless, for other types of transceivers, such as OFDM transceivers, this second source of error is still significant. Third, the estimation of represents the average frequency of the sleep clock during sleep $$\left( \text{i.e., } \bar{f}_{SC} = T_{sleep}^{-1} \int_{T_{sleep}} f_{SC}(t) dt \right),$$

and is not the current frequency at the time of wakeup. This is a source of error because the error increases as sleep time increases. Lastly, the SSCFE 216 is not updated during the awake period and hence may become obsolete for long awake period. Accordingly, the SSCFE 216, is not suitable for providing estimates when there is a long sleep time.

Figure 3:
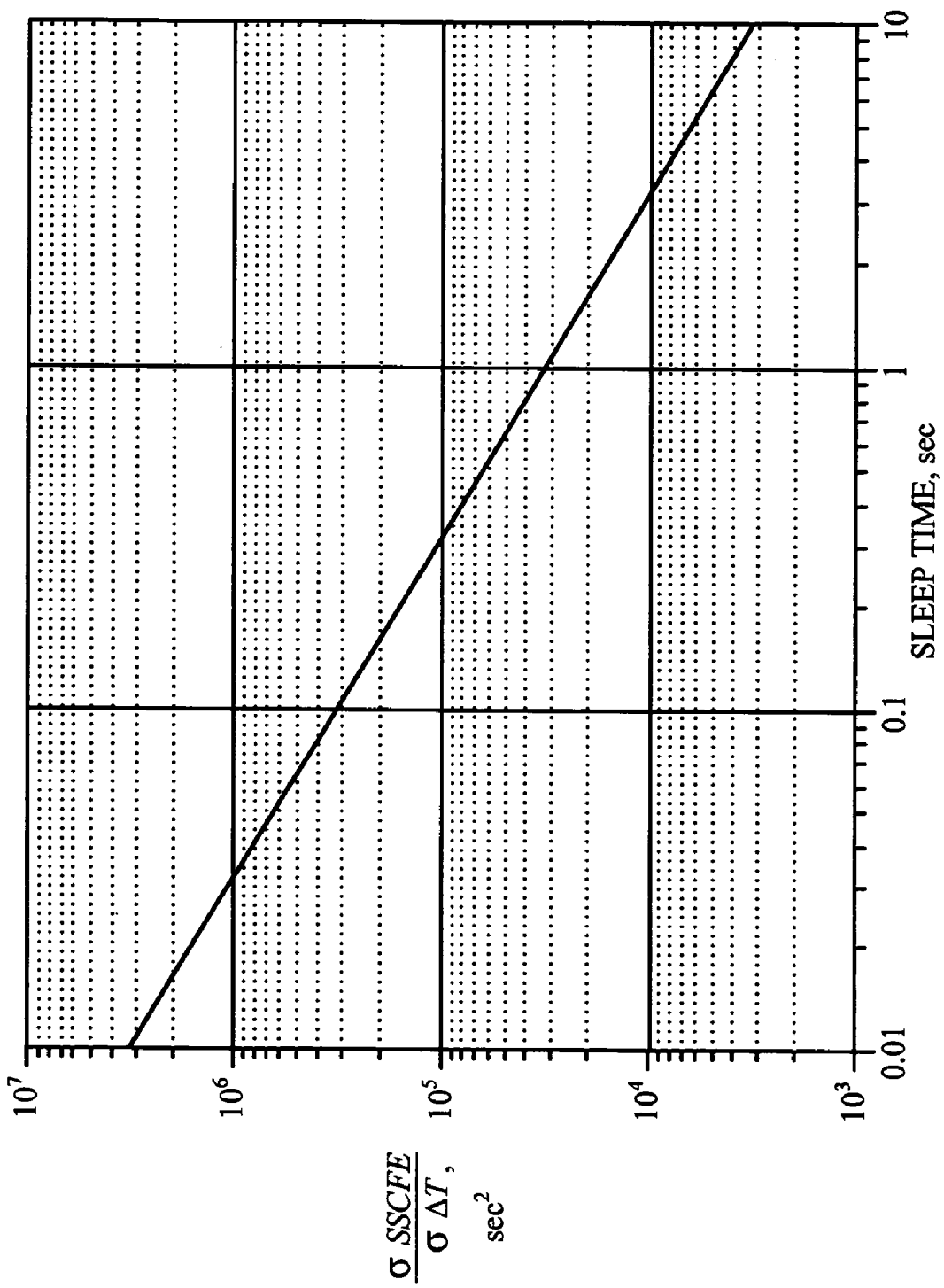
FIG. 3 is a plot of error variance of a synchronizer sleep clock estimator with respect to sleep time.

The degree of error of the SSCFE 216 may be quantified. Specifically, the estimation error variance $\epsilon^{SSCFE}$ due to synchronizer timing and FAP jitter (and ignoring sleep clock drift, for simplicity) may be given by the following relationship:

$$\varepsilon^{SSCFE} = \frac{\varepsilon_{\Delta T}}{T_{sleep}} f_{SC} \quad (11)$$

where $\epsilon_{\Delta T}$ is the synchronizer timing estimation error as well as FAP jitter variance. FIG. 3 is a plot of Equation (11) over a 10 second sleep time and a sleep clock frequency of 32 kHz. From this plot, it may be seen that SSCFE 216 is, in terms of estimation variance, not accurate for very short sleep times either. As another quantitative example in a CDMA transceiver, if the value of $\epsilon_{\Delta T} \approx 356$ n sec assuming no FAP jitter and the sleep time duration is 5 seconds, the ratio $\epsilon_{SSCFE} / f_{SC} \approx 0.07$ ppm. If the error of the SSCFE is too unreliable, it is noted that the sleep clock frequency estimator 206 is configured such that it will work without the frequency estimate from the SSCFE 216, as will be explained later.

Referring again to FIG. 2, the SSCFE 216 is configured to receive the $\Delta T$ and the sleep time $T_{sleep}$ from the processor 220 as indicated by communication line 222. Additionally, SSCFE 216 receives the previous sleep clock frequency estimate $\hat{f}_{SC}$ and the sleep clock frequency estimate $f_{SC}$ as indicated by lines 224 and 226, respectively. The SSCFE uses these input values to determine the estimate of the change in the slow clock frequency using equation (10) above. The SSCFE 216 outputs the value of $\epsilon$fhd $SC^{TSCFE}$ 228 to the combiner 218.

The combiner 218 is configured to selectively utilize the input values $\Delta$fhd $SC^{SSCFE}$ and fhd $SC^{TSCFE}$ (214, 228) to determine a sleep clock frequency estimate. As will be explained below in connection with FIG. 4, the combiner 218 utilizes weighting coefficients to selectively assign a reliability rating to the estimates $\Delta$fhd $SC^{SSCFE}$ and fhd $SC^{TSCFE}$ and combine the values such that those values with higher reliability are given greater weight or "credence." The output of the combiner is the estimated sleep clock frequency $\hat{f}_{SC}$ 230, which is sent to the processor 220. The processor 220, in turn, utilizes the estimated sleep clock frequency 230 to set the maximum sleep time and provide the estimate of the sleep clock frequency prior to directing the transceiver 200 entering into a sleep mode.

It is noted that CDMA transceivers typically utilize a fixed sleep and awake pattern in a slotted mode (i.e., $1.28 \cdot 2^{SCI}$ sec sleep and 4 msec awake). For this type of transceiver, the SSCFE 218 would have superior estimation performance over the sleep clock frequency estimator 212 for this type of fixed pattern. In other types of transceivers such as OFDM transceiver, however, the sleep-awake pattern is flexible. Accordingly, in these types of systems neither the SSCFE 218 or sleep clock frequency estimator 212 would yield superior performance over the other with such flexible patterns. Accordingly, in such types of systems, a combined use of the estimates of the SSCFE 218 and the sleep clock frequency estimator 212 is beneficial. This benefit is, in part, due to the fact that the two estimates are from independent sources, (i.e., the estimation errors are independent) and consequently provide an improved and robust estimate for variable sleep-awake patterns over using a single estimate. Notwithstanding, it is again noted that in the presently disclosed apparatus and methods, the slow clock frequency estimator 206 is configured such that it can work on TSCFE alone without the help from SSCFE. An implementation of an adaptive combiner, such as adaptive combiner 218, within a sleep clock frequency estimator is illustrated in FIG. 4.

Figure 4:
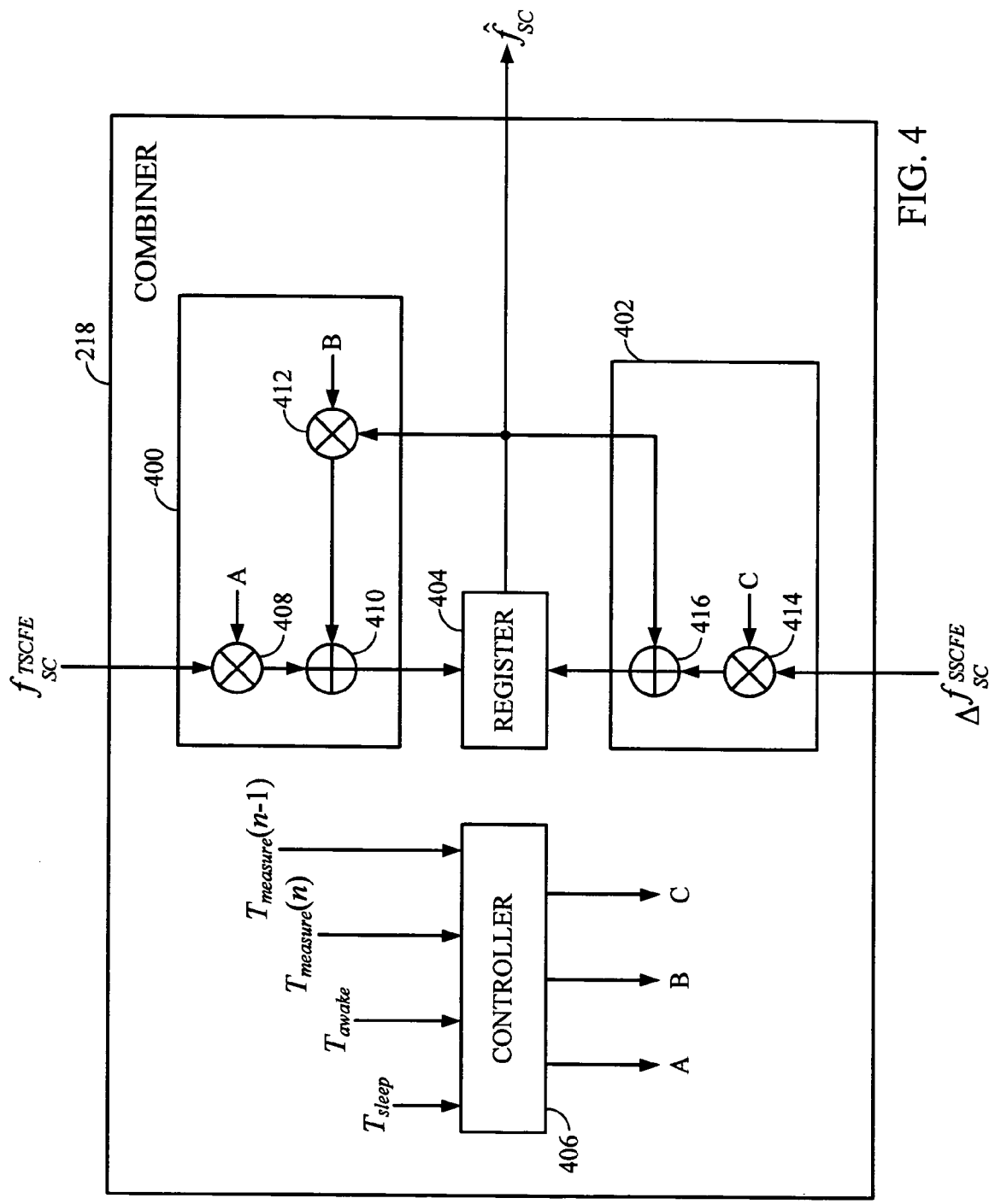
FIG. 4 is a block diagram of an exemplary sleep clock frequency estimator according to the present disclosure.

As illustrated in FIG. 4, the adaptive combiner 218 receives the estimates of the slow clock frequency (fhd $SC^{TSCFE}$) and the change in the slow clock frequency ($\Delta$fhd $SC^{SSCFE}$). A first operational block 400 within the combiner 218 receives the estimate of the slow clock frequency fhd $SC^{TSCFE}$ for further processing of fhd $SC^{TSCFE}$ with weighting coefficients A and B. Similarly, a second operational block 402 receives the change in the slow clock frequency $\Delta$fhd $SC^{TSCFE}$ for further processing with weighting coefficient C. Blocks 400 and 402 send processed outputs, which are values of $\hat{f}_{SC}$ to a register 404 for storage. Register 404 is configured as a storage register for storing a current value of $\hat{f}_{SC}$, but may be implemented with any suitable storage device. Additionally, although register 404 is illustrated as residing within the combiner 218, this storage device may be located as a discrete unit or could also be implemented in the processor 220 or a system memory device 232 shown in FIG. 2.

Combiner 218 also includes a controller 406, such as a microcontroller or microprocessor that is used to calculate the weighting coefficients A, B and C. The controller 406 receives various inputs from processor 220, for example, for use in determining the weighting coefficients. These inputs include the current wakeup duration ($T_{awake}$) of the wireless device 200, the previous sleep time duration prior to wakeup ($T_{sleep}$), the current measurement time of the TCXO sleep clock frequency estimator 212 ($T_{measure}(n)$), and the previous measurement time of the TCXO sleep clock frequency estimator 212 ($T_{measure}(n-1)$).

Additional variables used by controller 406 for determining the weighting coefficients include variance of the sleep clock $\sigma_{SC}^2$, variance of the sleep clock frequency estimate $\sigma_{\hat{f}SC}^2$, variance of the synchronizer sleep clock frequency estimate $\sigma_{SSCFE}^2$, variance of the synchronizer timing tracking $\Delta_{AT}^2$, and variance of the TCXO sleep clock frequency estimate $\sigma_{TSCFE}^2(n)$ for a current measurement time n. Because the variance of SSCFE 216 and TSCFE 212 estimates are dependent on the sleep time duration ($T_{sleep}$) and awake time duration ($T_{awake}$), respectively, and the sleep time and awake time vary, the weighting coefficients A, B and C are selectively or adaptively adjusted by combiner 218 "on the fly" by utilizing the awake time ($T_{awake}$) and sleep time ($T_{sleep}$) in the calculations of the weighting coefficients. As an example, the weighting coefficients may be calculated using the following equations:

$$A = \frac{\sigma_{\hat{f}SC}^2(n-1) + \sigma_{SC}^2}{\sigma_{TSCFE}^2(n) + \sigma_{\hat{f}SC}^2(n-1) + \sigma_{SC}^2} \quad (12)$$

$$= \frac{\beta\left(\frac{1}{T_{measure}(n)f_{FC}}\right)^2 + (0.063 \times 10^{-6}(T_{sleep}+T_{awake}))^2}{\left(\frac{1}{T_{measure}(n)f_{FC}}\right)^2 + \beta\left(\frac{1}{T_{measure}(n-1)f_{FC}}\right)^2 + (0.063 \times 10^{-6})^2(T_{sleep}+T_{awake})^2}$$

$$= \frac{\beta T_{measure}^{-2}(n-1) + 8(T_{sleep}+T_{awake})^2}{T_{measure}^{-2}(n) + \beta T_{measure}^{-2}(n-1) + 8(T_{sleep}+T_{awake})^2}$$

and $$B = \frac{T_{measure}^{-2}(n)}{T_{measure}^{-2}(n) + \beta T_{measure}^{-2}(n-1) + 8(T_{sleep}+T_{awake})^2} \quad (13)$$

and $$C = \frac{\alpha}{\sigma_{SSCFE}^2 + \sigma_{SC}^2} = \frac{0.063 \times 10^{-6}\sigma_{\Delta T}}{\sigma_{\Delta T}^2 T_{sleep}^{-2} + (0.063 \times 10^{-6})^2 T_{sleep}^2} \quad (14)$$

where β is a predetermined optimization constant. Coefficients A and B relate to the TCXO sleep clock frequency estimate $\hat{f}hd\ SC^{TSCFE}$ as do the variables in equations (12) and (13) above. Coefficient C, on the other hand, relates to the estimate of the change in the slow clock frequency $\Delta\hat{f}hd\ SC^{SSCFE}$ and the variables in equation (14) relate to the variance of the synchronizer slow clock frequency estimator 216 and the synchronizer 219. One of ordinary skill in the art will appreciate, however, that equations (12), (13), and (14) are only exemplary, and numerous other formulations that account for and weight the reliability of each sleep clock frequency estimate may be contemplated. It is noted that, in this particular implementation, the units of time used in the coefficients are measured in slow clock cycles, but other units could be used instead. Of further note, for an initial measurement where n =0, the value of $T_{measure}(n-1)$ will be equal to zero (i.e., $T_{measure}(-1)=0$).

It is noted that although controller 406 is shown as residing within the combiner 218, this device could also be implemented as a discrete unit. Furthermore, the system processor 220 could alternatively perform the functions carried out by controller 406.

From FIG. 4 it can be seen that the first operational block 400 includes various multipliers and an adder that are used to determine the frequency estimate output by the block 400 to the register 404. In particular, the block includes a first multiplier 408 that multiplies the TCXO sleep clock frequency estimate $\hat{f}hd\ SC^{TSCFE}$ by the coefficient A. The product of this multiplication is sent to an adder 410. Block 400 also includes a second multiplier 412 that multiplies the value of the estimated sleep clock frequency $\hat{f}_{SC}$ stored in register 404 by coefficient B. Multiplier 412 outputs the product to adder 410, where the products of multipliers 408 and 412 are summed together. It is noted that the sum of coefficients A and B will always be unity (1). Thus, coefficient A determines or "weights" the percentage of how much the TXCO sleep clock frequency estimate $\hat{f}hd\ SC^{TSCFE}$ is given relevance, and coefficient B likewise determines the percentage degree of relevance the previously determined sleep clock frequency estimate $\hat{f}_{SC}$ is given. Accordingly, the summed output of adder 410 is a newly determined sleep clock frequency estimate $\hat{f}_{SC}$ that is stored in register 404.

Block 402 also calculates an estimate of the sleep clock frequency $\hat{f}_{SC}$ and writes the value to register 404. In particular, the coefficient C provides a multiplier establishing a quantitative degree of reliability of the estimated change in the slow clock frequency ($\Delta\hat{f}hd\ SC^{SSCFE}$). After the value $\Delta\hat{f}hd\ SC^{SSCFE}$ is multiplied by coefficient C, this establishes a modified or weighted value of the change in the slow clock frequency that is subsequently added to the previous value of $\hat{f}_{SC}$ to determine a new estimated value $\hat{f}_{SC}$ written to register 404.

Figure 5:
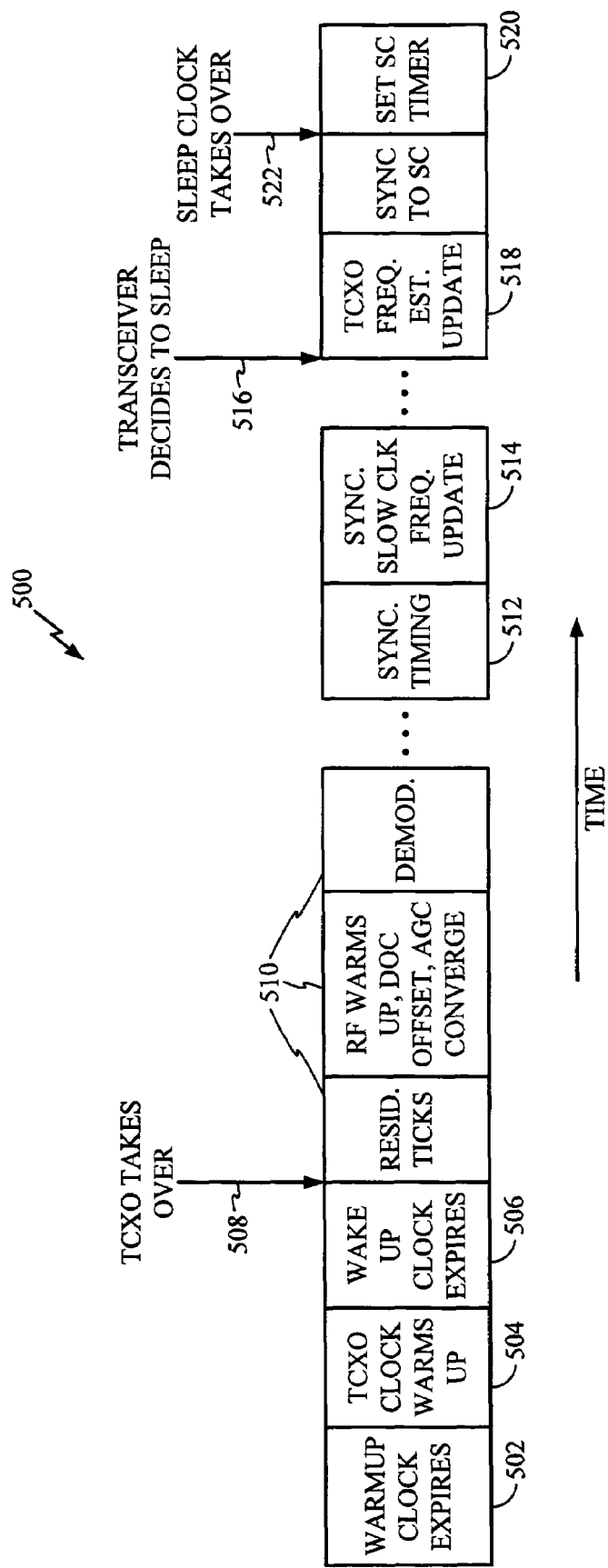
FIG. 5 is an exemplary time line illustrating a sequence of events occurring in a device employing the sleep clock frequency estimator of FIG. 4.

It is noted here that the value of $\hat{f}_{SC}$ stored in register 404 is temporal, and that the value is written from either block 400 or block 402, but not both. That is, whichever block operates latest, the value of $\hat{f}_{SC}$ from that block overwrites the value of $\hat{f}_{SC}$ presently stored in register 404. As an illustration of this temporal relationship, FIG. 5 shows a timeline 500 of the operation of a mobile wireless device, such as transceiver 200, utilizing the apparatus of FIGS. 2 and 4. Timeline 500 illustrates the operation of a device from just after wakeup from a sleep mode to the entry of another sleep period. After a warmup clock expires as shown at block 502, the fast clock (e.g., TCXO 202) warms up (block 504), and a wakeup clock expires (block 506), the fast clock takes over for system timing, as indicated by arrow 508. After the device is fully awakened, various operations pertinent to the device operation commence as shown in blocks 510. The synchronizer 219 then starts timing as indicated by block 512. Once the synchronizer 219 has started, the synchronizer slow clock frequency estimator 216 can update the estimate of $\Delta\hat{f}hd\ SC^{SS}_{CFE}$, which, in turn, allows the second operational block 402 to determine and store a new value for $\hat{f}_{SC}$ in register 404. After a further period of time, the processor 220 will decide to put the device 200 into a sleep mode, as indicated by arrow 516. At this time the slow clock frequency estimate $\hat{f}hd\ SC^{TSCFE}$ of the TCXO slow clock frequency estimator (TSCFE) 212 will be determined by the processor 220 (or similar logic in the estimator 212 itself) and delivered to block 400 in the combiner 218, which occurs at block 518 in FIG. 5. A new estimate for $\hat{f}_{SC}$ is then determined by block 400 and written to register 404, thus overwriting the previous new estimate written by block 402. Both estimates of $\hat{f}_{SC}$ from each of block 400 and 402 are valuable, as block 400, for example, uses the current estimate of $\hat{f}_{SC}$ stored in register 404, for determining the new estimate. Once the latest or newest estimate of $\hat{f}_{SC}$ is stored in register 404, this value can be read out the register by processor 220, for example, in setting the maximum sleep time (e.g., setting the sleep clock timer at block 520) just prior to entering sleep mode as indicated by arrow 522.

Figure 6:
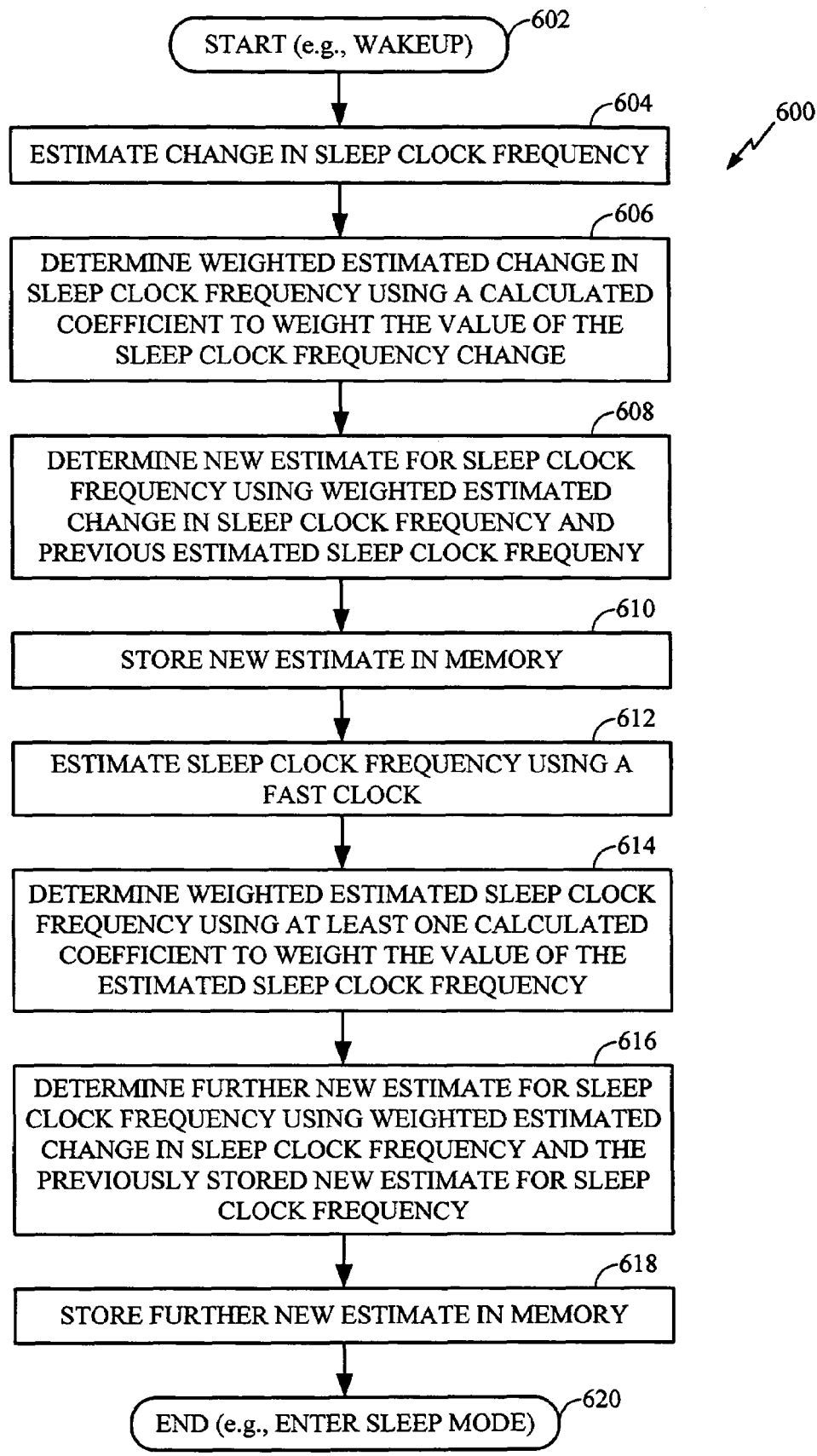
FIG. 6 is a flow diagram of an example method for estimating sleep clock frequency in a wireless device.

FIG. 6 illustrates a flow diagram of a method 600 for determining a slow clock frequency estimate $\hat{f}_{SC}$ in accordance with the present disclosure. The method 600 is initialized at block 602 and corresponds to a wakeup of device 200, for example. Flow proceeds to block 604, where an estimated change in sleep clock frequency is determined. SSCFE 216 may perform this part of the process, for example. Next, a weighted estimated change in sleep clock frequency is determined using a calculated coefficient (e.g., coefficient C) to weight the value of the sleep clock frequency change 606. This part of the process is implemented, for example, by the second operational block 402 within the combiner 218 and, more particularly with multiplier 414.

Flow then proceeds to block 608, where a new estimate for sleep clock frequency using the weighted estimated change in sleep clock frequency and a previously estimated sleep clock frequency ($\hat{f}_{SC}$), which is stored in register 404, for example. The process of block 608 may be effected with adder 416, for example. After the new estimate of the sleep clock frequency ($\hat{f}_{SC}$) is calculated, it is stored in a memory (e.g., register 404) as shown by block 610.

After the new estimate of the sleep clock frequency ($\hat{f}_{SC}$) is stored, an estimate of sleep clock frequency is determined using the fast clock as indicated in block 612. The TCXO sleep clock frequency estimator 212 may perform this part of the process, for example. Additionally, it is noted the estimator 212 may be operational simultaneously with the SSCFE 216 used to determine the change in the slow clock frequency, although the information determined by the estimator 212 will not be used until after the information from the SSCFE 216 is utilized in determining the new estimate of sleep clock frequency. After block 612, flow proceeds to block 614 for determination of a weighted estimated sleep clock frequency using at least one calculated coefficient (e.g., at least one of coefficients A and B) to weight the value of the estimated sleep clock frequency. The part of the process may be effected with first operational block 400 and, more particularly, with multipliers 408 and 412.

Next, a further new estimate for sleep clock frequency is determined at block 616 using the weighted estimated change in sleep clock frequency determined at block 614 and the previously stored new estimate for sleep clock frequency. Multiplier 412 (i.e., multiplying the stored new estimate with a coefficient) and the adder 410 perform this determination. Once this further new estimate is determined, it is stored in the memory device (e.g., register 404), thus overwriting the previously stored new estimate as indicated in block 618. Processor 220 may then use this further new estimate to set the sleep time for the transceiver 200, for example. The process ends at termination block 620, which may be the start of a sleep mode for the transceiver 200, for example.

Figure 7:
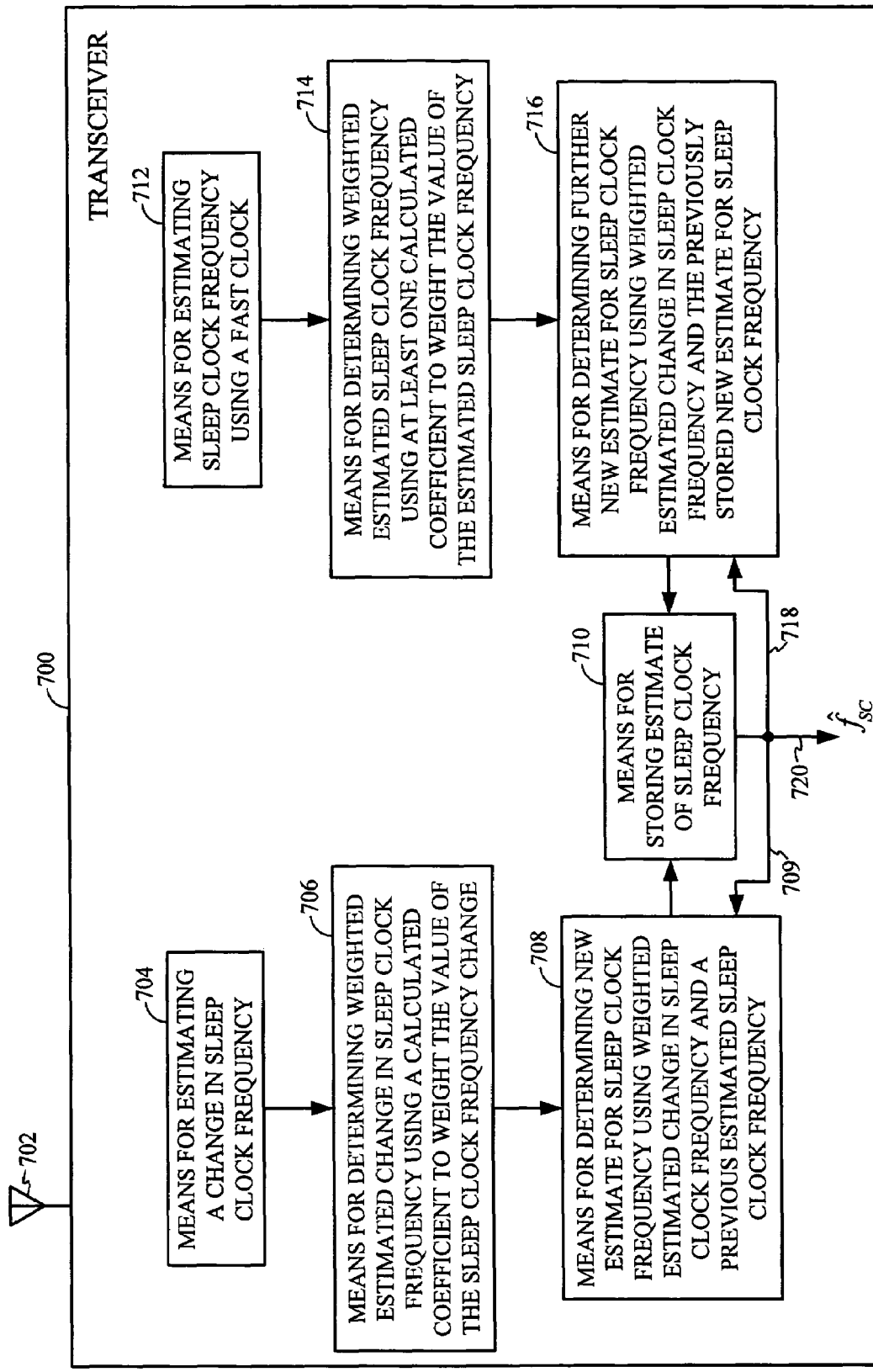
FIG. 7 is another example of a device employing a sleep clock frequency estimator.

FIG. 7 illustrates another example of a device employing a sleep clock frequency estimator. As illustrated, the device 700 may be a wireless device such as a transceiver. Accordingly, the device 700 includes an antenna 702 for receiving and transmitting wireless communication signals. Within device 700, are a fast clock and a sleep clock (not shown) for keeping system time during awake and sleep periods, respectively. The device then includes means for effecting frequency estimation of the sleep clock. Included are means for estimating a change in sleep clock frequency 704. Means 704 is equivalent to, as an example, the SSCFE 216 illustrated in FIG. 2 for determining an estimate of $\Delta\hat{f}hd\ SC^{SSCFE}$, as well as synchronizer 219 and processor 220, which determine variable used in determining the estimate of $\Delta\hat{f}hd\ SC^{SSCFE}$.

The output of means 704 is input to means 706 for determining a weighted estimated change in sleep clock frequency using a calculated coefficient to weight the value of the sleep clock frequency change. Means 706 is similar to the second operational block 402 of the combiner 218 shown in FIG. 4. In particular, means 706 can be effected with the multiplier 414 and controller 406, as an example. Once the weighted estimated change is determined, means 706 outputs this result to means 708 for determining a new estimate for sleep clock frequency (e.g., $\hat{f}_{SC}$) using weighted estimated change in sleep clock frequency and a previous estimated sleep clock frequency 708. As may be seen in FIG. 7, a previous estimated sleep clock frequency 709 is input (or fed back) to means 708 for determination of the new estimate. Means 708 may be implemented, for example, by adder 416 in second operational block 402. Means 708 then stores or writes the new estimated sleep clock frequency $\hat{f}_{SC}$ in a means 710 for storing the estimated sleep clock frequency. Means 710 may be implemented by a memory, a register (e.g., register 404) or any other suitable device capable of storing data.

The transceiver 700 also includes means 712 for estimating the sleep clock frequency using a fast clock. Means 712 can be effected with the TSCFE 212 discussed in FIG. 2, or any other similar device for measuring a clock using another clock, and a processor or hardware to calculate the frequency estimate (e.g., processor 220). Once the slow clock frequency is estimate with means 712, the result is input to means 714 for determining a weighted estimated sleep clock frequency using at least one calculated coefficient to weight the value of the estimated sleep clock frequency. Means 714 could be implemented, for example, with multipliers 408 and 412 in block 400 and controller 406 shown in FIG. 4, but is not necessarily limited to only such an implementation. The resultant weighted sleep clock frequency estimate output from means 714 is input to means 716 for determining a further new estimate for sleep clock frequency using weighted estimated change in sleep clock frequency and the previously stored new estimate for sleep clock frequency stored by means 708 is the storage means 710. As may be seen in FIG. 7, a feedback of the previously stored new estimate 718 is input to means 716 for making the determination of the further new estimate. Means 716 may be implemented with multiplier 412 as it applies a coefficient to the new estimate of sleep clock frequency and adder 410, which receives the products of multiplier 408 and 412. The resultant further new estimate of the sleep clock frequency is written in the means for storing 710, thereby overwriting the new estimate determined by means 708. The value of the further new estimate $\hat{f}_{sc}$ stored in storage means 710 may be accessed or output 720 for use by other means (not shown) in the transceiver 700 for determining a sleep time for the device 700.

The presently disclosed estimators above require no computation and can thus be implemented solely in hardware (except for the adders, which can be implemented in the microprocessor). Compared to the current design of the TCXO based sleep clock frequency estimator the presently disclosed sleep clock frequency estimator improves estimation accuracy by providing the microprocessor with the most recent estimate with longest possible and appropriate measurement period whenever the microprocessor requires. Additionally the disclosed constantly functioning estimators eliminate extra ±1 errors that can arise due to constant interruption of the fast clock counting process. Moreover, the disclosed estimators do not require intervention from the microprocessor (i.e., the microprocessor does not need to instruct the estimator when to start and when to stop counting).

The methods or algorithms described in connection with the examples disclosed herein may be embodied directly in hardware, in a software module executed by a processor, firmware, or in a combination of two or more of these. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to the storage medium. In the alternative, the storage medium may be integral to the processor. The processor and the storage medium may reside in an ASIC or similar processing circuit. The ASIC may reside in a user terminal or other wireless device. In the alternative, the processor and the storage medium may reside as discrete components in a user terminal or wireless device. Additionally the other components, such as those within the device 200 in FIG. 2, for example, could also reside with the ASIC or processing circuit, or reside as discrete components in the device 200.

The examples described above are merely exemplary and those skilled in the art may now make numerous uses of and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples. Accordingly, the novel aspects described herein is to be defined solely by the scope of the following claims.

What is claimed is:

1. An apparatus for determining a frequency estimate of a sleep clock comprising:
   a sleep clock frequency estimator configured to output a fast clock derived sleep clock frequency estimate;
   a sleep clock change frequency estimator configured to output an estimate of a change in frequency of the sleep clock; and
   a combiner configured to weight at least one of the fast clock derived sleep clock frequency estimate to obtain a weighted sleep clock frequency estimate and the estimate of the change in frequency of the sleep clock to obtain a weighted estimate of the change in frequency of the sleep clock, and to determine at least one new estimate of the sleep clock frequency using at least one of the weighted sleep clock frequency estimate and the weighted estimate of the change in frequency of the sleep clock.

2. The apparatus as defined in claim 1, wherein the combiner further includes:
   a memory device configured to store the at least one new estimate of the slow clock frequency weighting estimate.

3. The apparatus as defined in claim 1, wherein the combiner further includes:
   An operational block configured to receive the estimate of the change in frequency of the sleep clock from the sleep clock change frequency estimator and modify the estimate of the change in frequency of the sleep clock using at least one weighting coefficient and output the at least one new estimate of the slow clock frequency.

4. The apparatus as defined in claim 3, wherein the operational block further includes:
   a multiplier configured to modify the estimate of the change in frequency by multiplying the estimate of the change in frequency of the sleep clock by the at least one weighting coefficient; and
   an adder configured to add a resultant product of the multiplier to a previous estimate of the sleep clock frequency stored in a memory device.

5. The apparatus as defined in claim 1, wherein the combiner further includes:
   an operational block configured to receive the fast clock derived estimate of the frequency of the sleep clock from the sleep clock frequency estimator and modify the fast clock derived estimate of the frequency of the sleep clock using at least one weighting coefficient to obtain the at least one new estimate of the sleep clock frequency.

6. The apparatus as defined in claim 5, wherein the operational block further includes:
   a first multiplier configured to modify the fast clock derived estimate of the frequency of the sleep clock by multiplying the estimate of the change in frequency of the sleep clock by a first weighting coefficient;
   a second multiplier configured to multiply a previous estimate of the sleep clock frequency stored in a memory device by a second weighting coefficient; and
   an adder configured to add resultant products of the first and second multipliers to obtain the at least one new estimate of the sleep clock frequency.

7. The apparatus as defined in claim 1, wherein the combiner further includes:
   a controller configured to receive information concerning a wireless device and to adaptively calculate one or more weighting coefficients used to determine at least one of the weighted slow clock frequency estimate and the weighted estimate of the change in frequency of the sleep clock.

8. The apparatus as defined in claim 7, wherein the information concerning the wireless device includes one or more of a sleep time duration ($T_{sleep}$) of the device, an awake time duration ($T_{awake}$) of the device, variance of the sleep clock, variance of the sleep clock frequency estimator, variance of the sleep clock change frequency estimator, and variance of the sleep clock.

9. The apparatus as defined in claim 1, wherein the combiner further comprises:
   a memory device configured to store the at least one new estimate of the sleep clock frequency;
   a first operational block in communication with the memory device and configured to receive the estimate of the change in frequency of the sleep clock from the sleep clock change frequency estimator, to modify the estimate of the change in frequency of the sleep clock using a first weighting coefficient, to determine the at least new estimate of the sleep clock frequency using the modified estimate of the change in frequency of the sleep clock, and to store the at least one new estimate of the slow clock frequency in the memory device; and a second operational block in communication with the memory device and configured to receive the fast clock derived estimate of the frequency of the sleep clock from the sleep clock frequency estimator, to modify the fast clock derived estimate of the frequency of the sleep clock using at least a second weighting coefficient, to determine a further new estimate based on the modified fast clock derived estimate of the frequency of the sleep clock, and to overwrite the at least one new estimate of the slow clock frequency by storing the further new estimate of the sleep clock frequency in the memory device.

10. A processing circuit for estimating a sleep clock frequency for use in a wireless transceiver system comprising:

a sleep clock frequency estimator configured to output a fast clock derived sleep clock frequency estimate;

a sleep clock change frequency estimator configured to output an estimate of a change in frequency of the sleep clock;

a combiner configured to selectively weight at least one of the fast clock derived sleep clock frequency estimate to obtain a weighted sleep clock frequency estimate and the estimate of the change in frequency of the sleep clock to obtain a weighted estimate of the change in frequency of the sleep clock, and to determine at least one new estimate of the sleep clock frequency using at least one of the weighted sleep clock frequency estimate and the weighted estimate of the change in frequency of the sleep clock;

a memory device configured to store the at least one new estimate of the slow clock frequency weighting estimate; and a processor configured to read the at least one new estimate from the memory device and calculate a system sleep time based on the at least one new estimate prior to entering the system into a sleep mode.

11. The processing circuit as defined in claim 10, wherein the combiner further includes:

an operational block configured to receive the estimate of the change in frequency of the sleep clock from the sleep clock change frequency estimator and modify the estimate of the change in frequency of the sleep clock using at least one weighting coefficient and output the at least one new estimate of the slow clock frequency.

12. The processing circuit as defined in claim 11, wherein the operational block further includes:

a multiplier configured to modify the estimate of the change in frequency by multiplying the estimate of the change in frequency of the sleep clock by the at least one weighting coefficient; and an adder configured to add a resultant product of the multiplier to a previous estimate of the sleep clock frequency stored in the memory device.

13. The processing circuit as defined in claim 10, wherein the combiner further includes:

an operational block configured to receive the fast clock derived estimate of the frequency of the sleep clock from the sleep clock frequency estimator and modify the fast clock derived estimate of the frequency of the sleep clock using at least one weighting coefficient to obtain the at least one new estimate of the sleep clock frequency.

14. The processing circuit as defined in claim 13, wherein the operational block further includes:

a first multiplier configured to modify the fast clock derived estimate of the frequency of the sleep clock by multiplying the estimate of the change in frequency of the sleep clock by a first weighting coefficient;

a second multiplier configured to multiply a previous estimate of the sleep clock frequency stored in a memory device by a second weighting coefficient; and an adder configured to add resultant products of the first and second multipliers to obtain the at least one new estimate of the sleep clock frequency and to store the at least one new estimate of the sleep clock frequency in the memory device.

15. The processing circuit as defined in claim 10, further comprising:

a controller configured to receive information concerning the wireless system and to adaptively calculate one or more weighting coefficients used to determine at least one of the weighted slow clock frequency estimate and the weighted estimate of the change in frequency of the sleep clock.

16. The processing circuit as defined in claim 15, wherein the information concerning the wireless device includes one or more of a sleep time duration ($T_{sleep}$) of the device, an awake time duration ($T_{awake}$) of the device, variance of the sleep clock, variance of the sleep clock frequency estimator, variance of the sleep clock change frequency estimator, and variance of the sleep clock.

17. The processing circuit as defined in claim 10, wherein the combiner further comprises:

a first operational block in communication with the memory device and configured to receive the estimate of the change in frequency of the sleep clock from the sleep clock change frequency estimator, to modify the estimate of the change in frequency of the sleep clock using a first weighting coefficient, to determine the at least new estimate of the sleep clock frequency using the modified estimate of the change in frequency of the sleep clock, and to store the at least one new estimate of the slow clock frequency in the memory device; and a second operational block in communication with the memory device and configured to receive the fast clock derived estimate of the frequency of the sleep clock from the sleep clock frequency estimator, to modify the fast clock derived estimate of the frequency of the sleep clock using at least a second weighting coefficient, to determine a further new estimate based on the modified fast clock derived estimate of the frequency of the sleep clock, and to overwrite the at least one new estimate of the slow clock frequency by storing the further new estimate of the sleep clock frequency in the memory device.

18. A wireless device for use in a mobile communications network comprising:

a sleep clock frequency estimator configured to output a fast clock derived sleep clock frequency estimate;

a sleep clock change frequency estimator configured to output an estimate of a change in frequency of the sleep clock;

a combiner configured to selectively weight at least one of the fast clock derived sleep clock frequency estimate to obtain a weighted sleep clock frequency estimate and the estimate of the change in frequency of the sleep clock to obtain a weighted estimate of the change in frequency of the sleep clock, and to determine at least one new estimate of the sleep clock frequency using at least one of the weighted sleep clock frequency estimate and the weighted estimate of the change in frequency of the sleep clock;

a memory device configured to store the at least one new estimate of the slow clock frequency weighting estimate; and a processor configured to read the at least one new estimate from the memory device and calculate a sleep time of the wireless device based on the at least one new estimate prior to entering the system into a sleep mode.

19. The wireless device as defined in claim 18, wherein the combiner further includes:

an operational block configured to receive the estimate of the change in frequency of the sleep clock from the sleep clock change frequency estimator and modify the estimate of the change in frequency of the sleep clock using at least one weighting coefficient and output the at least one new estimate of the slow clock frequency.

20. The wireless device as defined in claim 19, wherein the operational block further includes:

a multiplier configured to modify the estimate of the change in frequency by multiplying the estimate of the change in frequency of the sleep clock by the at least one weighting coefficient; and an adder configured to add a resultant product of the multiplier to a previous estimate of the sleep clock frequency stored in the memory device.

21. The wireless device as defined in claim 18, wherein the combiner further includes:

an operational block configured to receive the fast clock derived estimate of the frequency of the sleep clock from the sleep clock frequency estimator and modify the fast clock derived estimate of the frequency of the sleep clock using at least one weighting coefficient to obtain the at least one new estimate of the sleep clock frequency.

22. The wireless device as defined in claim 21, wherein the operational block further includes:

a first multiplier configured to modify the fast clock derived estimate of the frequency of the sleep clock by multiplying the estimate of the change in frequency of the sleep clock by a first weighting coefficient;

a second multiplier configured to multiply a previous estimate of the sleep clock frequency stored in a memory device by a second weighting coefficient; and an adder configured to add resultant products of the first and second multipliers to obtain the at least one new estimate of the sleep clock frequency and to store the at least one new estimate of the sleep clock frequency in the memory device.

23. The wireless device as defined in claim 18, further comprising:

a controller configured to receive information concerning the wireless device and to adaptively calculate one or more weighting coefficients used to determine at least one of the weighted slow clock frequency estimate and the weighted estimate of the change in frequency of the sleep clock.

24. The wireless device as defined in claim 23, wherein the information concerning the wireless device includes one or more of a sleep time duration ($T_{sleep}$) of the device, an awake time duration ($T_{awake}$) of the device, variance of the sleep clock, variance of the sleep clock frequency estimator, variance of the sleep clock change frequency estimator, and variance of the sleep clock.

25. The wireless device as defined in claim 18, wherein the combiner further comprises:

a first operational block in communication with the memory device and configured to receive the estimate of the change in frequency of the sleep clock from the sleep clock change frequency estimator, to modify the estimate of the change in frequency of the sleep clock using a first weighting coefficient, to determine the at least new estimate of the sleep clock frequency using the modified estimate of the change in frequency of the sleep clock, and to store the at least one new estimate of the slow clock frequency in the memory device; and a second operational block in communication with the memory device and configured to receive the fast clock derived estimate of the frequency of the sleep clock from the sleep clock frequency estimator, to modify the fast clock derived estimate of the frequency of the sleep clock using at least a second weighting coefficient, to determine a further new estimate based on the modified fast clock derived estimate of the frequency of the sleep clock, and to overwrite the at least one new estimate of the slow clock frequency by storing the further new estimate of the sleep clock frequency in the memory device.

26. A method for estimating the frequency of a sleep clock comprising:

estimating a change in sleep clock frequency;

determining a weighted estimated change in sleep clock frequency using a calculated coefficient to weight the value of the sleep clock frequency change;

determining a new estimate for sleep clock frequency using the weighted estimated change in sleep clock frequency and a previous estimated sleep clock frequency and storing the new estimate in a memory device;

estimating a sleep clock frequency using a fast clock;

determining a weighted estimated sleep clock frequency using at least another calculated coefficient to weight the value of the estimated sleep clock frequency;

determining a further new estimate for sleep clock frequency using weighted estimated change in sleep clock frequency and the previously stored new estimate for sleep clock frequency; and storing the further new estimate in memory such that the further new estimate replaces the new estimate.

27. The method as defined in claim 26, wherein determining a weighted estimated change in sleep clock frequency using a calculated coefficient to weight the value of the sleep clock frequency change includes:

adaptively calculating the calculated coefficient by taking into account at least one of a sleep time duration ($T_{sleep}$) of the device, an awake time duration ($T_{awake}$) of the device, variance of the sleep clock, variance of the sleep clock change frequency estimator, and variance of the sleep clock.

28. The method as defined in claim 26, wherein determining a weighted estimated sleep clock frequency using at least another calculated coefficient to weight the value of the sleep clock frequency change includes:

adaptively calculating the calculated coefficient by taking into account at least one of a sleep time duration ($T_{sleep}$) of the device, an awake time duration ($T_{awake}$) of the device, variance of the sleep clock, variance of the sleep clock frequency estimator, and variance of the sleep clock.

29. The method as defined in claim 26, further comprising:

determining a sleep timing for a duration of a sleep mode of a wireless device using the further new estimate in memory.

30. A computer readable medium having instructions stored thereon, the stored instructions, when executed by a processor, cause the processor to perform a method of estimating the frequency of a sleep clock, the method comprising:
- estimating a change in sleep clock frequency;
- determining a weighted estimated change in sleep clock frequency using a calculated coefficient to weight the value of the sleep clock frequency change;
- determining a new estimate for sleep clock frequency using the weighted estimated change in sleep clock frequency and a previous estimated sleep clock frequency and storing the new estimate in a memory device;
- estimating a sleep clock frequency using a fast clock;
- determining a weighted estimated sleep clock frequency using at least another calculated coefficient to weight the value of the estimated sleep clock frequency;
- determining a further new estimate for sleep clock frequency using weighted estimated change in sleep clock frequency and the previously stored new estimate for sleep clock frequency; and
- storing the further new estimate in memory such that the further new estimate replaces the new estimate.

31. The computer readable medium as defined in claim 30, wherein determining a weighted estimated change in sleep clock frequency using a calculated coefficient to weight the value of the sleep clock frequency change includes:
- adaptively calculating the calculated coefficient by taking into account at least one of a sleep time duration ($T_{sleep}$) of the device, an awake time duration ($T_{awake}$) of the device, variance of the sleep clock, variance of the sleep clock change frequency estimator, and variance of the sleep clock.

32. The computer readable medium as defined in claim 30, wherein determining a weighted estimated sleep clock frequency using at least another calculated coefficient to weight the value of the sleep clock frequency change includes:
- adaptively calculating the calculated coefficient by taking into account at least one of a sleep time duration ($T_{sleep}$) of the device, an awake time duration ($T_{awake}$) of the device, variance of the sleep clock, variance of the sleep clock frequency estimator, and variance of the sleep clock.

33. The computer readable medium as defined in claim 30, further comprising:
- determining a sleep timing for a duration of a sleep mode of a wireless device using the further new estimate in memory.

34. An apparatus for estimating the frequency of a sleep clock comprising:
- means for estimating a change in the sleep clock frequency;
- means for determining a weighted estimated change in sleep clock frequency using a calculated coefficient to weight the value of the sleep clock frequency change;
- means for determining a new estimate for sleep clock frequency using the weighted estimated change in sleep clock frequency and a previous estimated sleep clock frequency;
- means for storing that stores the new estimate;
- means for estimating a sleep clock frequency using a fast clock;
- means for determining a weighted estimated sleep clock frequency using at least one calculated coefficient to weight the value of the estimated sleep clock frequency; and
- means for determining a further new estimate for sleep clock frequency using weighted estimated change in sleep clock frequency and the previously stored new estimate for sleep clock frequency; and
- wherein the means for storing stores the further new estimate such that the further new estimate replaces the new estimate.

* * * * *